May 17, 1955
G. E. GIBBS
2,708,695
STEERING WHEEL OPERATED HORN SWITCH
Filed Feb. 6, 1953
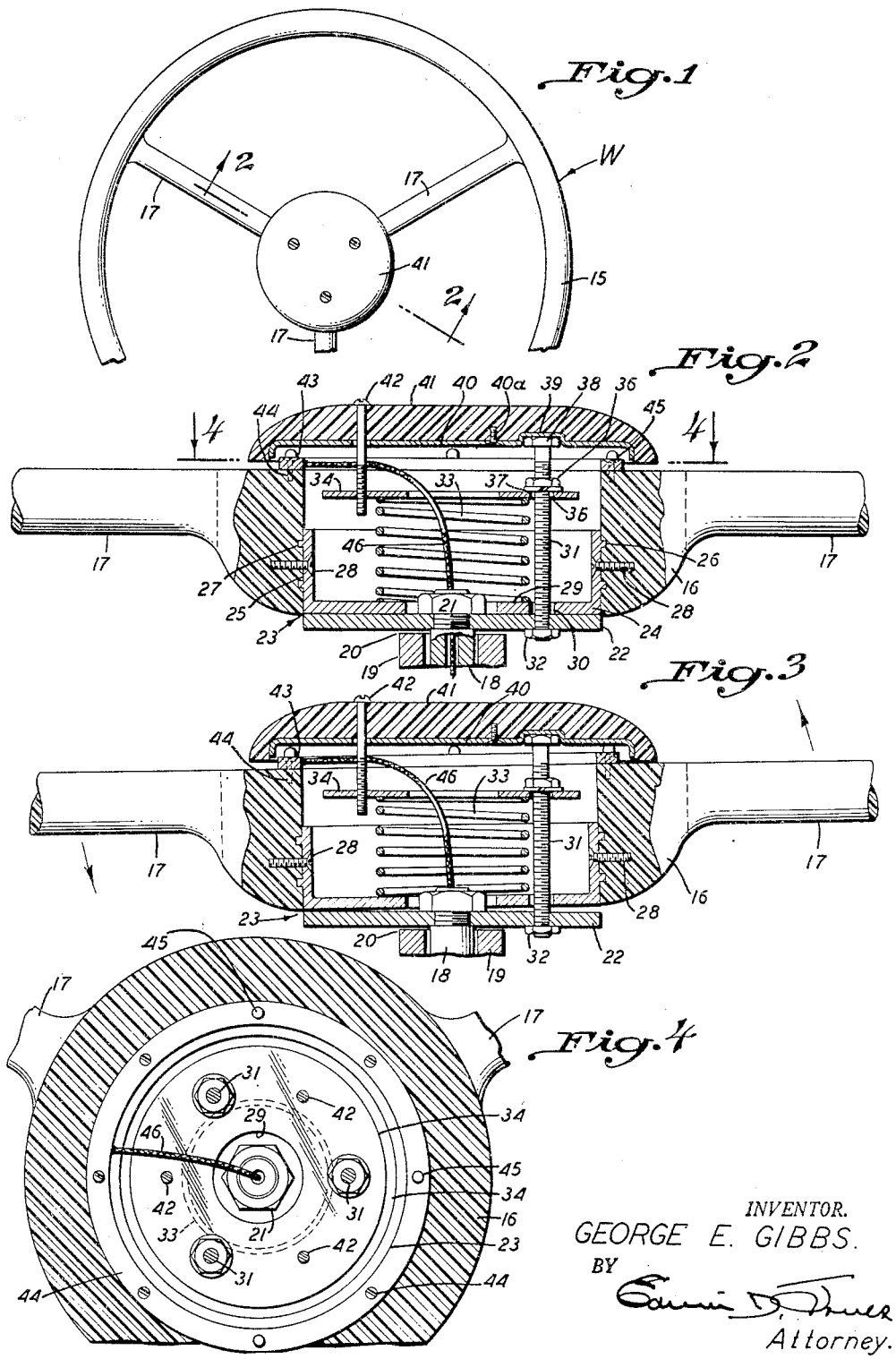
INVENTOR.
GEORGE E. GIBBS.
BY
Attorney.

United States Patent Office 2,708,695
Patented May 17, 1955

2,708,695

STEERING WHEEL OPERATED HORN SWITCH

George E. Gibbs, Thermal, Calif.

Application February 6, 1953, Serial No. 335,485

6 Claims. (Cl. 200—61.55)

My invention relates to electric signalling horns for motor vehicles, and particularly to a switch for controlling sounding thereof.

It is a purpose of my invention to provide a horn control switch which is closable through tilting of the steering wheel of the vehicle, thus permitting sounding of the horn without the driver releasing either hand from the steering wheel as is necessary with the conventional horn button switch located at the center of the steering wheel.

It is a further purpose of my invention to provide in combination a horn control switch and a means for mounting the steering wheel for universal tilting movement in relation to the steering shaft, the mounting being such that to close the switch and sound the horn, the driver is compelled to exert an upward pull on the wheel to produce tilting thereof. By this mode of operation not only can the horn be sounded without the driver removing either hand from the steering wheel, but it allows the hands and arms of the driver to rest and even lean on the steering wheel, as is customary during normal steering, without tilting the wheel and accidentally sounding the horn. Moreover, in emergency steering such as when suddenly turning the vehicle to avoid a collision or other accident, it is almost a natural reaction for the driver to tension his arm and hand muscles and in a manner to exert an upward pull at some point about the rim of the steering wheel so as to tilt the wheel upwardly. Thus the horn switch is closed concurrently with such emergency steering to sound the horn and thereby enhance the chance of avoiding a collision or other accident.

Another purpose of my invention is the provision of an electric switch structure which is exceedingly simple in its arrangement of parts, and which also may be constructed and installed at an exceedingly low cost.

I will describe only one form of steering wheel operated horn switch embodying my invention, and will then point out the novel features thereof in claims.

In the accompanying drawings:

Fig. 1 is a fragmentary top plan view of a steering wheel having incorporated therein one form of horn control switch embodying my invention.

Fig. 2 is an enlarged sectional view taken on the line 2—2 of Fig. 1, and showing the parts of my invention in normal position such as they occupy during normal steering of a vehicle.

Fig. 3 is a view similar to Fig. 2 showing the steering wheel tilted, and the parts of my invention occupying positions in response to such tilting to effect closure of the horn control switch.

Fig. 4 is a horizontal sectional view taken on the line 4—4 of Fig. 2.

Referring specifically to the drawings, W indicates generally a steering wheel constructed of plastic or other suitable insulating material, and comprising a rim 15 connected to a hub 16 by spokes 17. This wheel W is mounted on the upper end of a steering shaft 18 which projects from the upper end of a steering column 19, where it is reduced in diameter to provide a shoulder 20, and the reduced portion screw-threaded to receive a nut 21. A base member 22 in the form of a metal plate of disc form is secured to the shaft 18 between the nut 21 and the shoulder 20 so that such base member is rotatable with the shaft.

Supported on the base member 22 is a coupling member 23 constructed of metal and of cup form, such member comprising a plate 24 preferably of the same diameter as the member 22, and provided at its perimeter with an upstanding annular collar 25. This collar 25 is of a diameter to be received in the hub 16, and it may be fixed to the hub in any suitable manner so that rotational and tilting movements of the steering wheel will be transmitted to the member 23 as is necessary in carrying out my invention. To fix the member 23 to the hub 16, I have shown ribs 26 on the outer side of the collar 25 which are received in grooves 27 on the inner periphery of the hub 16, and screws 28 extending through the collar and into the hub. It will be understood that the ribs and grooves lock the hub against axial movement on the collar, while the screws secure the hub against rotation on the collar.

The plate 24 has a central opening 29 in which the nut 21 is freely received, and other openings 30 through which bolts 31 extend. The openings 30 are larger in diameter than the bolts so that the plate can tilt in any direction on the base member 22. The lower ends of these bolts are threaded in the base member 22, and nuts 32 are provided for securing the bolts in a position to extend upwardly from the base member.

From the foregoing structural description it will be manifest that the coupling member 23 and the bolts 31 provide a means for operatively connecting the steering wheel to the steering shaft 18 so that the latter can be rotated by the steering wheel, and yet the wheel is mounted for universal tilting movement on the base member 22, since the plate 24 can be tilted on the member.

By means of a helical compression spring 33 the coupling member 23 is urged against the base member 22 so as to normally hold the steering wheel against tilting movement. This spring is interposed between the plate 24 and a metal plate 34 through which the bolts 31 freely extend by the provision of suitable openings 35 in the plate 34. The plate 34 is adjustable vertically on the bolt 31 to vary the compression of the spring 33, and for this purpose nuts 36 are threaded on the bolt and securable in any adjusted position thereon by lock washers 37.

The heads 38 of the bolts are of hexagonal form and fit within correspondingly shaped recesses 39 in a metal contact plate 40 secured by screws 40a to the underside of a cap 41 made of plastic or other suitable insulating material. This cap 41 is secured to the plate 34 by means of screws 42 which extend downwardly through the cap and are threaded in the plate to allow vertical adjustment of the plate in accordance with adjustment of the nuts 36 to vary the tension of the spring 33.

The horn control switch of my invention includes the plate 40 which constitutes the stationary contact of the switch, and being in contact with the bolt heads 38 is grounded through the bolts 31, the base member 22, etc., to the ground side of a vehicle carried battery (not shown). The switch also includes a metal ring 43 secured on the top side of the hub 16 at the inner periphery thereof by means of screws 44 or in any other suitable manner. This ring 43 constitutes the movable contact of the switch, and may be formed on its top side with metal contact points 45 at spaced intervals circumferentially thereof. An insulated conducting wire 46 is fixed at one end to the ring 43, and extends downwardly through the bore of the shaft 18 for connection to an electric horn (not shown).

In practice, before the cap 41 is applied, the plate 34 is adjusted on the bolts 31 by the nuts 36 to so tension the spring 33 that the pressure exerted by it on the plate 34 will hold the wheel W against being tilted by pressing downwardly on the wheel rim, and yet allow the wheel to be tilted when pressure or pull is exerted upwardly at the wheel rim sufficient to overcome the tension of the spring. Thus in operation, the wheel W, under the action of the spring 33, is normally held in a position in which its axis is aligned with the steering shaft 18 so that the contact points 45 are maintained spaced from the contact plate 40 thus holding the horn switch in open position.

However, when it is desired to sound the horn during normal driving or otherwise, the driver exerts a pressure or pull upwardly on the steering wheel at any point on its rim, which causes the coupling member 23 to tilt on the base member 22 as illustrated in Fig. 3, thereby permitting the hub 16 to tilt to a position in which at least one contact point 45 engages the contact plate 40 to close the horn switch and sound the horn. It will be understood that immediately upon relieving the wheel of such upward pressure, the spring 33 restores the wheel and the coupling member 23 to normal position, thus moving the contact points out of engagement with the contact plate 40 to open the switch and discontinue sounding of the horn.

If the spring 33 has been initially adjusted so that the pressure against the member 23 renders it difficult to tilt the wheel by pressing on its rim upwardly, then the driver can ease the operation by simultaneously exerting a pressure downwardly on the wheel rim at a point diametrically opposite to the point at which pressure is exerted upwardly. It will be understood, however, that the spring at no time allows tilting of the wheel to effect switch closure by exerting a downward pressure alone on its rim. Thus, the horn switch cannot be accidentally closed under the weight of the driver's hands and arms when leaning against the wheel as is customary in normal driving.

My invention is primarily designed to effect sounding the horn concurrently with emergency steering necessitated by the driver abruptly turning the vehicle in an attempt to avoid a collision. Simultaneously with such emergency steering it is a natural tendency of the driver to tension his arm and hand muscles and in such manner that an upward pull is exerted on the steering wheel at some point about its circumference, and a downward push at an opposite point. Such involuntary action of the driver results in tilting the steering wheel to produce closure of the switch and sounding of the horn. Thus it can be said that the horn is automatically sounded in such an emergency steering, which in many instances is effective to signal the driver of an oncoming vehicle, or a pedestrian, in time sufficient to avoid a collision.

Although I have herein shown and described only one form of steering wheel operated horn switch embodying my invention, it is to be understood that various changes and modifications may be made herein without departing from the spirit of my invention and the spirit and scope of the appended claims.

What I claim is:

1. In a vehicle having a steering shaft and a steering wheel: means connecting said wheel to said shaft for rotating the latter through said wheel; said means having parts relatively movable to allow universal tilting of said wheel in relation to the axis of said shaft; yieldable means urging said wheel axially downward, yet allowing said wheel to be tilted in response to pressure exerted upwardly on the rim of said wheel, but resisting pressure exerted downwardly thereon to tilt said wheel; and a normally open electrical switch having one contact on said wheel, and another contact normally spaced upwardly from said wheel but engageable by said one contact when said wheel is tilted upwardly.

2. In a vehicle having a steering shaft and a steering wheel of insulating material: a base member fixed to said shaft; a coupling member fixed to the hub of said wheel; means connecting the coupling member to the base member for universal tilting movement thereon to, in turn, mount said wheel for universal tilting movement; spring means within said wheel hub for urging said connecting means to a position in which it is axially alined with said shaft; a cap of insulating material fixed in relation to the base member and positioned above said wheel hub; and a switch having one contact fixed to said cap, and another contact fixed to said wheel hub and engageable with the cap contact through tilting of said wheel.

3. In a vehicle having a steering shaft and a steering wheel of insulating material: a base member fixed to said shaft; a coupling member fixed to the hub of said wheel and supported on the base member; bolts fixed in the base member and extending loosely through the coupling member to allow universal tilting of the latter on the base member to, in turn, mount said wheel for universal tilting movement; a plate on the bolts; a coiled compression spring between the plate and the coupling member for yieldably holding the coupling member alined axially with the base member; a cap above and carried by the plate; a contact member secured to the underside of the cap and engaging the heads of the bolts; and a second contact member fixed to the hub of said wheel for engagement with the cap contact member under tilting movement of said wheel.

4. In a vehicle having a steering shaft and a steering wheel of insulating material; a base member fixed to said shaft; a coupling member fixed to the hub of said wheel and supported on the base member; bolts fixed in the base member and extending loosely through the coupling member to allow universal tilting of the latter on the base member to, in turn, mount said wheel for universal tilting movement; a plate on the bolts; a coiled compression spring between the plate and the coupling member for yieldably holding the coupling member alined axially with the base member; nuts engaging the top side of the plate and adjustable on the bolts to vary the spacing of the plate in relation to the coupling member and to thereby adjust the tension of said spring; a cap above and carried by the plate; a contact member secured to the underside of the cap and engaging the heads of the bolts; and a second contact member fixed to the hub of said wheel for engagement with the cap contact member under tilting movement of said wheel.

5. In a vehicle having a steering shaft and a steering wheel of insulating material: a base member fixed to said shaft; a coupling member fixed to the hub of said wheel and supported on the base member; bolts fixed in the base member and extending loosely through the coupling member to allow universal tilting of the latter on the base member to, in turn, mount said wheel for universal tilting movement; a plate on the bolts; a coiled compression spring between the plate and the coupling member for yieldably holding the coupling member alined axially with the base member; a cap above and carried by the plate; a contact member secured to the underside of the cap and having recesses therein receiving the heads of the bolts and corresponding in shape thereto so as to hold the bolts against rotation; and a second contact member fixed to the hub of said wheel for engagement with the cap contact member under tilting movement of said wheel.

6. In a vehicle having a steering shaft and a steering wheel of insulating material: means connecting said wheel to said shaft for universal tilting movement in relation to said shaft and for rotating the latter; an electrical horn switch having two contacts; insulating means supporting one contact above the hub of said wheel; means securing the second contact to the wheel hub below the one contact; and spring means urging said wheel downwardly to a position axially alined with said shaft wherein the second contact disengages the other contact, said spring means yielding under a force exerted upwardly on said wheel to allow tilting thereof and cause the second contact to engage the other contact.

References Cited in the file of this patent

UNITED STATES PATENTS

| | | |
|---|---|---|
| 2,167,031 | Pitt | July 25, 1939 |
| 2,193,223 | Chayne et al. | Mar. 12, 1940 |